United States Patent Office 3,308,122
Patented Mar. 7, 1967

3,308,122
TRIIMIDAZOLYL TRIAZINE COMPOUNDS
Henry Tolkmith, Midland, Mich., assignor to The Dow Chemical Company, Midland, Mich., a corporation of Delaware
No Drawing. Filed May 10, 1965, Ser. No. 454,647
5 Claims. (Cl. 260—249.6)

The present invention is directed to a triimidazolyl triazine compound of the formula

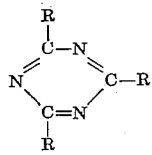

In the above and succeeding formulae, each R independently represents an imidazolyl radical of the formula

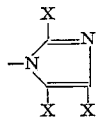

wherein each X independently represents a member selected from the group consisting of hydrogen, loweralkyl, and phenyl, the total number of carbon atoms in all X substituents in any one imidazolyl radical being an integer of from 0 to 15, both inclusive. The products of the present invention are liquids or crystalline solid materials which are somewhat soluble in many common organic solvents and of very low solubility in water.

In the present specification and claims, the term "imidazolyl" is employed to describe a radical of the following formula, only,

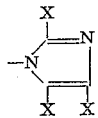

and the term "loweralkyl" is employed to describe an alkyl radical containing from 1 to a maximum of 4, both inclusive, carbon atoms.

Those products of the present invention wherein all of the three R groups are identical are prepared by reacting cyanuric chloride, which compound has the formula

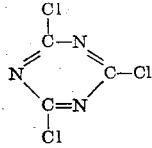

with an imidazole compound of the formula RH.

The reaction is conveniently carried out in the presence of an inert liquid reaction medium, which is preferably an organic liquid, and in the presence of a trialkylamine, typically triethylamine, as hydrogen chloride acceptor. Organic liquids which are suitable as reaction media include the hydrocarbons, such as benzene, toluene, xylene, and cyclohexane; ethers, such as diethyl ether, 1,2-dimethoxyethane, and tetrahydrofuran; and tertiary amines, such as triethylamine. It is generally preferred to avoid the use as reaction medium of any substance having a reactive hydrogen, because its use may result in side reactions.

The reaction of cyanuric chloride and imidazole compound takes place at temperatures of from 0° C. to the boiling temperature of the reaction medium employed. However, side reactions involving the cyanuric chloride and imidazole compound are more likely to occur at elevated temperatures within this range; therefore, it is preferred that the contacting of the reactants be carried out at temperatures below 20° C., and, even more preferably, at temperatures below about 10° C. After the contacting of the reactants has been completed, the reaction mixture can then be heated to elevated temperatures, with lessened danger of side reactions occurring, to carry forward the reaction.

The amounts of the reactants to be employed are not critical, some of the desired product being obtained when employing the reactants in any amounts. However, the reaction consumes the reactants in amounts representing one molecular proportion of cyanuric chloride, three molecular proportions of imidazole compound, and three molecular proportions of hydrogen chloride acceptor, and the use of amounts which represent such proportions is preferred. The reaction goes forward readily, with the production of the desired product and hydrogen chloride by-product, which appears as the hydrochloride salt of the hydrogen chloride acceptor employed.

In carrying out the reaction, the reactants are contacted together in any convenient fashion and maintained for a period of time in the reaction temperature range. Some of the desired product is formed immediately upon the contacting together of the reactants; however, the yield of the desired product is increased by permitting the reaction mixture to stand for a period of time, preferably with stirring or other mechanical agitation of the mixture. Following the completion of the reaction, the reaction mixture can be employed for the useful purposes of the present invention. However, if desired, product can be separated from the reaction mixture. In many instances, for example, where the product compound is to be employed for the control of fungal organisms attacking foliage and a phytotoxic substance has been employed as reaction medium, separation is preferable.

The separation is carried out in conventional procedures. Most typically, the reaction mixture is filtered to separate the insoluble hydrochloride by-product salt, and organic liquid employed as reaction mixture is removed from the filtrate by evaporation under subatmospheric pressure to separate the desired product. The product so obtained can be used without purification or can be purified by conventional procedures such as recrystallization or solvent extraction.

Those products of the present invention wherein not all of the R groups are identical are prepared in a variation of the above procedure. More particularly, the cyanuric chloride is reacted, preferably sequentially, with two or three different reactants of the general imidazole compound formula set forth above. The reaction, as above, is carried out in the presence of a trialkylamine, typically triethylamine, as hydrogen chloride acceptor, and in the presence of an inert liquid reaction medium.

While the order of contacting of cyanuric chloride, the two or three imidazole compound reactants, and hydrogen chloride acceptor is not critical, some of the desired product being formed regardless, better yields are obtained if certain procedures are followed. The reaction consumes the reactants in amounts representing one molecular proportion of cyanuric chloride, three molecular proportions of hydrogen chloride acceptor, and one molecular proportion of each imidazole compound reactant from which one R group is derived. It is preferred to employ such amounts.

The hydrogen chloride acceptor can be added portionwise simultaneously with the sequential addition of each imidazole compound reactant. However, it is preferred that sufficient hydrogen chloride acceptor be mixed with cyanuric chloride in inert liquid reaction media to serve in the reaction of both, or all three, imidazole compound reactants. Furthermore, it is not critical in which order the two or three imidazole compounds are reacted. However, where two R moieties are identical and a third is different, it is preferred that the one "different" moiety be introduced by reaction of cyanuric chloride with a first imidazole compound reactant and the two remaining "identical" imidazolyl moieties be introduced, later by further reaction with a second imidazole compound reactant. These preferred procedures have the effect of reducing side reactions and increasing the yield of product.

Therefore, in the preferred procedure for preparing those products wherein not all R groups are identical, one molecular proportion of cyanuric chloride is mixed with inert liquid reaction medium and three molecular proportions of hydrogen chloride acceptor. In the instance wherein each R group is different, there is then added to the mixture in sequence, (1) one molecular proportion of the first imidazole compound reactant in inert liquid reaction medium; (2) one molecular proportion of the second imidazole compound reactant in inert liquid reaction medium; and (3) one molecular proportion of the third imidazole compound reactant in inert liquid reaction medium. In the instance wherein two R moieties are identical and the remaining R moiety is different, there is added to the initial mixture, in sequence, (1) one molecular proportion of the first imidazole compound reactant having the "different" imidazolyl moiety in inert liquid reaction medium; and (2) two molecular proportions of the imidazole compound reactant having the "identical" imidazolyl moiety.

In carrying out this variation to prepare the products wherein not all of the R groups are identical, all other reaction conditions, such as temperatures, organic liquids to be employed as reaction media, and the like, are as hereinabove set forth.

In all preparations procedures hereinabove discussed, the imidazolyl moiety is introduced by reaction of cyanuric chloride with the imidazole compound. The imidazole compound ordinarily occurs as a tautomeric form in which no hydrogen is fixedly positioned at any given ring-nitrogen atom. Accordingly, in the reaction of certain of the imidazole compound reactants, in the methods hereinabove presented, isomeric products are produced. The products can be separated by such conventional separation procedures as chromatographic separation and fractional crystallization.

The following examples set forth the best methods now known for carrying out the present invention, and will enable those skilled in the art to practice the present invention.

*Example 1.—2,4,6-triimidazol-1-yl-s-triazine*

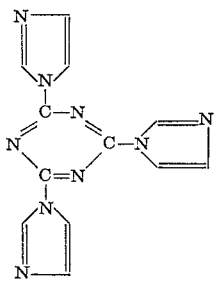

Cyanuric chloride (37 grams; 0.2 mole) was mixed with 250 milliliters of 1,2-dimethoxyethane to form a first mixture. This mixture was added to a second mixture of imidazole (41 grams; 0.60 mole) and triethylamine (67 grams; 0.66 mole) in 250 milliliters of 1,2-dimethoxyethane. The resulting reaction mixture was maintained at a temperature of about 7° C. during the addition. Following the completion of the addition, the reaction mixture was heated and refluxed for several hours. Thereafter, the reaction mixture was permitted to cool to room temperature, filtered to separate triethylamine hydrochloride by-product salt, and 1,2-dimethoxyethane removed from the filtrate by evaporation under subatmospheric pressure to obtain the desired 2,4,6-triimidazol-1-yl-s-triazine product as a residue. Impurities were removed from the product residue by extraction with acetone, yielding a purified product melting at 151–153° C.

*Example 2.—2-imidazol-1-yl-4-(2-methylimidazol-1-yl-6-(4(and 5)-phenylimidazol-1-yl)-s-triazine*

Cyanuric chloride (37 grams; 0.2 mole) and triethylamine (75.9 grams; 0.75 mole) are dissolved in 250 milliliters of benzene to prepare a first mixture. This mixture is cooled to a temperature of about 10° C. and there is then added to the first mixture, sequentially, in the following order, (1) imidazole (13.6 grams; 0.2 mole) in 100 milliliters of benzene; (2) 2-methylimidazole (16 grams; 0.2 mole) in 100 milliliters of benzene; and (3) 4-phenylimidazole (36 grams; 0.25 mole) in 100 milliliters of benzene. During the additions, the temperature of the resulting reaction mixture is maintained at about 10° C. Each of the three sequential additions is carried out over a period of about two to three hours. After the completion of all additions, the reaction mixture is refluxed for several hours, and then permitted to cool to room temperature. The cooled reaction mixture is filtered to separate triethylamine hydrochloride by-product, and benzene is removed from the filtrate by evaporation under subatmospheric pressure to separate the desired 2-imidazol-1-yl-4-(2-methylimidazol-1-yl)-6 - (4(and 5) - phenylimidazol-1-yl)-s-triazine product. The product has a molecular weight of 369.4.

Other representative products of the present invention include the following:

2,4,6 - tris(2-methylimidazol-1-yl)-s-triazine, having a molecular weight of 321.4.

2,4,6 - tris(2-phenylimidazol-1-yl)-s-triazine, having a molecular weight of 507.6.

2 - imidazol-1-yl-4,6-bis(2-methyl-4,5-diphenylimidazol-1-yl)-s-triazine, having a molecular weight of 611.7.

2,4,6-tris(4(and 5) - tert-butylimidazol-1-yl)-s-triazine, having a molecular weight of 447.6.

2,4 - diimidazol-1-yl-6-(4,5-di-n-propylimidazol-1-yl)-s-triazine, having a molecular weight of 363.4.

2,4,6-tris(2-isopropylimidazol-1-yl)-s-triazine, having a molecular weight of 450.5.

2,4-diimidazol-1-yl-6-(2-ethyl-4(and 5)-methyl-5(and 4) phenylimidazol-1-yl)-s-triazine, having a molecular weight of 397.5.

The products of the present invention are useful as fungicides in a variety of household, industrial, and agricultural operations. They are employed with excellent results for the control of fungi which attack the aerial portions of plants. They can be included in inks, adhesives, soaps, polymeric materials, cutting oils or in oil or latex paints. They can also be distributed in textiles, cellulosic materials, or in grains, or can be employed in the impregnation of wood and lumber. Additionally, they can be applied to seeds. In yet other procedures, the compounds can be vaporized or sprayed or distributed as aerosols into the air, or onto surfaces in contact with the air. In employing the products of the present invention as fungicides, the unmodified products can be used, or the products can be employed in compositions of which one or more of the products constitute the fungicidal agent.

The composition can be a liquid, powder, dust, aerosol, or the like. In such composition, the active agent is modified with one or more of a plurality of additaments including water or other liquid carriers, such as organic solvents, petroleum distillates or the like; surface active dispersing agents; and finely divided inert solids.

In representative operations, 2,4,6-triimidazol-1-yl-s-triazine was employed for the control of late blight (*Phytophora infestans) on potato plants. The compound was dispersed in water to prepare an aqueous spray composition which contained 75 parts of the 2,4,6-trimidazol-1-yl-s-triazine compound, as sole active fungicidal agent, per million parts by weight of ultimate composition. Young potato plants were sprayed to the point of run off with this composition, permitted to dry, and thereafter inoculated with spores of late blight. A group of untreated young potato plants was similarly inoculated to serve as a control. Both groups of plants were held for 6 days under conditions conducive to the growth of the late blight. At the end of the six-day period, all plants were examined to determine the percent kill and control of late blight fungus. The treated group of potato plants was found to be completely free from late blight, whereas the control group bore a heavy infestation of the fungus.

I claim:
1. Compound of the formula

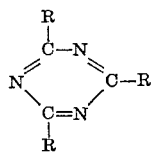

wherein each R independently represents an imidazolyl radical of the formula

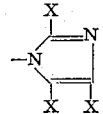

wherein each X independently represents a member selected from the group consisting of hydrogen, loweralkyl, and phenyl, the total number of carbon atoms in all X substituents in any one imidazolyl radical being an integer of from 0 to 15, both inclusive.

2. 2,4,6-triimidazol-1-yl-s-triazine.
3. 2,4,6-tris(2-methylimidazol-1-yl)-s-triazine.
4. 2,4 - bis(4,5-di-n-propylimidazol-1-yl)-6-imidazol-1-yl-s-triazine.
5. 2,4 - diimidazol-1-yl-6-(2-ethyl-4(and 5) - methyl-5(and 4)-phenylimidazol-1-yl)-s-triazine.

No references cited.

WALTER A. MODANCE, *Primary Examiner.*
JOHN M. FORD, *Assistant Examiner.*